3,498,978
3-PIPECOLINE DERIVATIVES
Frank H. Clarke, Jr., Armonk, and Fred B. Block, Hartsdale, N.Y., assignors to Geigy Chemical Corporation, Ardsley, N.Y., a corporation of New York
No Drawing. Filed Apr. 10, 1967, Ser. No. 629,387
Int. Cl. C07d 87/46, 29/36; A61k 27/00
U.S. Cl. 260—247.2                                                  9 Claims

ABSTRACT OF THE DISCLOSURE

N-carbamyl- and N-thiocarbamyl-4-propionoxy-4-phenyl-3-pipecolines are neutral analgesics and are obtained from the corresponding N-unsubstituted pipecolines through the action of a carbamyl chloride, thiocarbamyl chloride, isocyanate or thioisocyanate, or from the corresponding N-cyanopipecoline through the action of hydrogen peroxide or hydrogen sulfide.

DETAILED DESCRIPTION

The present invention relates to novel organic compounds and to processes for their preparation. In particular the present invention relates to compounds of the formula:

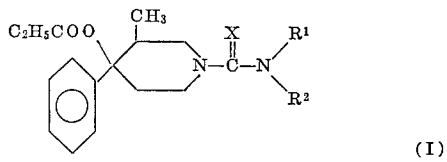

(I)

wherein X is oxygen or sulfur and each of $R^1$ and $R^2$ taken independently is hydrogen or (lower)alkyl and $R^1$ and $R^2$ taken together with the nitrogen to which they are attached are morpholino, piperidino or pyrrolidino.

The foregoing N-carbamyl- and N-thiocarbamyl-4-propionoxy-4-phenyl-3-pipecolines demonstrate analgesic properties with little or no addiction liability and are thus useful for the treatment of pain such as is encountered in postoperative, postpartum and traumatic conditions, arthritis, cephalalia, bursitis and the like. They may be administered alone, or in combination with other agents such as aspirin, phenacetin, caffeine and the like, in suitable pharmaceutical formulations such as tablets, capsules, suspensions, suppositories and the like.

In the context of this specification and the claims, the term "alkyl" and derivations thereof containing the root "alk," such as alkylene, alkanoyl and the like, represent a hydrocarbon chain of up to thirty carbon atoms, or a group containing such a chain. When qualified by the designation "lower" such chains will contain from one to six carbon atoms, inclusively. It is to be understood that when the functional groups of derivations of alkyl implicitly require more than one carbon atom, such as the double bond in "alkenyl," there will be at least two carbon atoms present.

The compounds of the present invention are prepared via treatment of the compound of the formula:

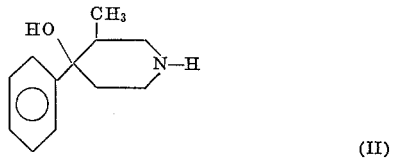

(II)

with a carbamyl chloride or thiocarbamyl chloride in an inert solvent such as benzene or chloroform. The carbamyl chloride of thiocarbamyl chloride may be replaced with an amine, including ammonia, and phosgene or thiophosgene. Alternatively, the compounds of Formula II are treated with an isocyanate or thioisocyanate, or with a salt thereof, to yield the compounds of Formula I wherein at least one of $R^1$ and $R^2$ is hydrogen.

Those compounds of Formula I wherein X is oxygen may be converted to those wherein X is sulfur via the action of phosphorus pentasulfide. Those compounds of Formula I wherein X is sulfur may be converted to those wherein X is oxygen via the action of mercuric oxide.

Alternatively the compounds of the present invention wherein both $R^1$ and $R^2$ are hydrogen are obtained via the action of hydrogen peroxide in the presence of base or aqueous acid or the action of hydrogen sulfide on the corresponding N-cyano derivative to yield the N-carbamyl or N-thiocarbamyl compounds respectively. The requisite N-cyano derivatives are obtained from the corresponding known N-methyl compounds through the action of cyanogen bromide.

Following introduction of the N-carbamyl or N-thiocarbamyl compound the free hydroxy group is acylated with propionic anhydride or propionyl chloride. To insure the complete homogeneity of the free hydroxy compound, this acylation is preferably preceded by a brief alkaline hydrolysis, particularly when the N-carbamyl or N-thiocarbamyl group has been introduced via the use of a carbamyl or thiocarbamyl chloride or an isocyanate or isothiocyanate. The conditions of reaction of the N-cyano compound and hydrogen peroxide or hydrogen sulfide reaction generally do not involve the free hydroxy group and acylation may follow directly.

The following examples will serve to further typify the nature of the present invention.

Example 1

To a solution of 39.1 mole of 4-hydroxy-4-phenyl-pipecoline in 400 ml. of dimethylformamide and 7.5 g. of sodium bicarbonate under anhydrous conditions is added dropwise a solution of 4.2 g. (39.1 mole) of dimethylcarbamyl chloride in 200 ml. dimethylformamide. The mixture is refluxed for 16 hours, filtered and concentrated in vacuo.

The residue is added to a molar equivalent amount of sodium hydroxide in 500 ml. of methanol and heated at reflux for one hour. The reaction mixture is then concentrated in vacuo, rendered acidic with hydrochloric acid, washed with water and extracted with chloroform. The dried chloroform extracts are evaporated to dryness to yield N-dimethylcarbamyl-4-hydroxy-4-phenyl-3-pipecoline.

One and a half grams of this material, 10 ml. of dry pyridine and 1.17 g. of propionic anhydride are briefly heated to bring about solution. The solution is stirred at room temperature overnight and then treated with sufficient 2 N hydrochloric acid to render the solution acidic to Congo red. The mixture is then extracted with chloroform and the extracts dried and concentrated to yield N-dimethylcarbamyl-4-propionoxy-4-phenyl-3-pipecoline which is recrystallized from ethanol.

Example 2

To a solution of 7.16 mmole of 4-hydroxy-4-phenyl-3-pipecoline in 50 ml. chloroform is added 0.76 g. of sodium bicarbonate and 1.28 g. (8.6 mmole) of 4-morpholinocarbonyl chloride. The mixture is refluxed for four hours, filtered and concentrated in vacuo. The residue is then hydrolysed and esterified as described in Example 1 and the product then recrystallized from benzene:cyclohexane:ethyl acetate to yield N-morpholinocarbonyl-4-propionoxy-4-phenyl-3-pipecoline.

Substitution of equivalent amounts of piperidinocarbonyl chloride and pyrrolidinocarbonyl chloride for 4-morpholinocarbonyl chloride in the above procedure yields N-piperidinocarbonyl-4-propionoxy-4-phenyl-3- pipecoline and N-pyrrolidinocarbonyl-4-propionoxy-4-phenyl-3-pipecoline, respectively.

Example 3

To a solution of 1.54 mmole of 4-hydroxy-4-phenyl-3-pipecoline in 25 ml. glacial acetic acid is added 1.24 g. of potassium isocyanate. The resulting solution is heated 10 minutes on a steam bath, then diluted with 100 ml. of water and rendered basic with 50% sodium hydroxide solution. The mixture is extracted with chloroform and the chloroform phase washed with water, dried, and evaporated. The residue is hydrolysed and esterified as described in Example 1 to yield N-carbamyl-4-propionoxy-4-phenyl-3-pipecoline.

Example 4

To a mixture of 0.72 mmole of 4-hydroxy-4-phenyl-3-pipecoline, 1.85 g. of sodium bicarbonate and 50 ml. of anhydrous benzene are added 17 ml. of 12.5% phosgene in benzene. After refluxing for 1½ hours the solution is cooled, filtered and concentrated in vacuo. The residue is treated with 8 ml. of 4.3% of alcoholic ammonia solution at 95° C. for 16 hours in a pressure bottle. After evaporation, the resulting residue is taken up in chloroform and the chloroform solution is dried, washed with water and evaporated. The residue is then hydrolysed and esterified as in Example 1 to yield N-carbamyl-4-propionoxy-4-phenyl-3-pipecoline.

Example 5

A solution of 0.38 mmole of 4-hydroxy-4-phenyl-3-pipecoline and 0.3 g. of methyl isothiocyanate in 70 ml. of anhydrous tetrahydrofuran is refluxed for 18 hours under anhydrous conditions. The solution is concentrated and cooled. The solid is collected and then hydrolysed and esterified as described in Example 1 to yield N-methylthiocarbamyl-4-propionoxy-4-phenyl-3-pipecoline.

Example 6

A solution of 1.68 mmole of 4-hydroxy-4-phenyl-3-pipecoline, 0.25 g. (2.75 mmole) of ethyl isothiocyanate and 60 ml. of anhydrous tetrahydrofuran is refluxed for 3¼ hours. The solution is concentrated in vacuo and the residue is hydrolysed and esterified as described in Example 1 to yield N-ethylthiocarbamyl-4-propionoxy-4-phenyl-3-pipecoline.

Example 7

To a mixture of .031 mole of N-cyano-4-propionoxy-4-phenyl-3-pipecoline, 9.7 ml. of 30% hydrogen peroxide and 30 ml. of ethanol are added slowly 5.6 ml. of 6 N aqueous sodium hydroxide solution with stirring and external cooling maintaining the temperature at 35–40°. When addition is complete, the cooling bath is removed and the mixture is stirred at 50–60° for three and one-half hours. The mixture is then cooled and the solid is collected by filtration, washed with water, dried and esterified as described in Example 1 to yield N-carbamyl-4-propionoxy-4-phenyl-3-pipecoline.

The requisite N-cyano compound may be obtained as follows:

To a solution of 2.6 g. of cyanogen bromide in 30 ml. of chloroform is added at room temperature a solution of 2.01 mole of N-methyl-4-propionoxy-4-phenyl-3-pipecoline in 30 ml. of chloroform over a period of 45 minutes. The solution is refluxed for three hours and then evaporated to dryness in vacuo. The residue is crystallized from ethanol to yield N-cyano-4-propionoxy-4-phenyl-3-pipecoline.

Example 8

A solution of 9.03 mmole of N-cyano-4-propionoxy-4-phenyl-3-pipecoline, 12.8 ml. triethylamine and 75 ml. pyridine is cooled to −70°. Hydrogen sulfide is introduced over a period of 10 minutes and the solution then allowed to return to room temperature and stand overnight. The solution is then concentrated and the residue heated at reflux with 50 ml. ethanol and 10 ml. of 1 N sodium hydroxide for 2 hours. The pH is adjusted to 6–7 and the solid thus formed is collected, dried and esterified as described in Example 1 to yield N-thiocarbamyl-4-propionoxy-4-phenyl-3-pipecoline.

What is claimed is:
1. A compound of the formula:

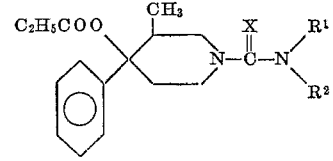

wherein X is oxygen or sulfur and
  each of $R^1$ and $R^2$ taken independently is hydrogen or (lower)alkyl and $R^1$ and $R^2$ taken together with the nitrogen to which they are attached are morpholino, piperidino, or pyrrolidino.

2. The compound according to claim 1 wherein X is oxygen and each of $R^1$ and $R^2$ is methyl.

3. The compound according to claim 1 wherein X is oxygen and $R^1$ and $R^2$ taken together with the nitrogen to which they are attached are morpholino.

4. The compound according to claim 1 wherein X is oxygen and each of $R^1$ and $R^2$ is hydrogen.

5. The compound according to claim 1 wherein X is sulfur, $R^1$ is hydrogen and $R^2$ is methyl.

6. The compound according to claim 1 wherein X is sulfur, $R^1$ is hydrogen and $R^2$ is ethyl.

7. The compound according to claim 1 wherein X is sulfur and each of $R^1$ and $R^2$ is hydrogen.

8. The compound according to claim 1 wherein X is oxygen and $R^1$ and $R^2$ taken together with the nitrogen to which they are attached are piperidino.

9. The compound according to claim 1 wherein X is oxygen and $R^1$ and $R^2$ taken together with the nitrogen to which they are attached are pyrrolidino.

References Cited

UNITED STATES PATENTS 3,158,616  11/1964  Adickes et al. _____ 260—294.3

ALEX MAZEL, Primary Examiner

A. M. T. TIGHE, Assistant Examiner

U.S. Cl X.R.

260—247.1, 293.4, 294.3; 424—232, 248, 253, 267